(12) United States Patent
Koenig et al.

(10) Patent No.: US 12,334,233 B2
(45) Date of Patent: Jun. 17, 2025

(54) COOLED CHARGING CABLE

(71) Applicant: LEONI KABEL GMBH, Roth (DE)

(72) Inventors: Guenter Koenig, Schwabach (DE); Sven Spindler, Hiltpoltstein (DE)

(73) Assignee: LEONI KABEL GMBH, Roth (DE)

( * ) Notice: Subject to any disclaimer, the term of this patent is extended or adjusted under 35 U.S.C. 154(b) by 148 days.

(21) Appl. No.: 18/019,105

(22) PCT Filed: Jul. 27, 2021

(86) PCT No.: PCT/EP2021/071032
§ 371 (c)(1),
(2) Date: Feb. 1, 2023

(87) PCT Pub. No.: WO2022/028959
PCT Pub. Date: Feb. 10, 2022

(65) Prior Publication Data
US 2023/0282392 A1 Sep. 7, 2023

(30) Foreign Application Priority Data
Aug. 6, 2020 (DE) .......................... 102020120819.7

(51) Int. Cl.
*H01B 9/00* (2006.01)
*B60L 53/18* (2019.01)
*H01B 7/42* (2006.01)

(52) U.S. Cl.
CPC .............. *H01B 7/423* (2013.01); *B60L 53/18* (2019.02); *H01B 9/006* (2013.01)

(58) Field of Classification Search
CPC .................................................. H01B 7/0072

USPC .......................................................... 174/47
See application file for complete search history.

(56) References Cited

U.S. PATENT DOCUMENTS

| 10,766,374 | B2 | 9/2020 | Heyne et al. |
| 11,804,315 | B2* | 10/2023 | Neumann ............... B60L 53/18 |
| 2010/0227764 | A1 | 9/2010 | Willen et al. |
| 2012/0199390 | A1* | 8/2012 | Oka ........................ H01B 7/423 174/70 R |
| 2017/0144558 | A1* | 5/2017 | Remisch .................. B60L 53/18 |
| 2017/0338006 | A1 | 11/2017 | Gontarz et al. |

(Continued)

FOREIGN PATENT DOCUMENTS

| CN | 106782835 A | 5/2017 |
| DE | 202015009535 U1 | 2/2018 |

(Continued)

OTHER PUBLICATIONS

German Priority Application 102020120819.7 Examination Report Dated Oct. 18, 2023.

*Primary Examiner* — Chau N Nguyen
(74) *Attorney, Agent, or Firm* — Tarolli, Sundheim, Covell & Tummino LLP (57) ABSTRACT

A single line for a charging cable, for example for electric vehicles, and a charging cable having single lines of this kind are provided. The single line (10) includes a cooling hose (12) in which a coolant (14) can be conveyed, and at least one uninsulated electrical conductor (16). The at least one uninsulated electrical conductor (16) is connected in a thermally conductive manner to the cooling hose (12) in such a way that the at least one uninsulated electrical conductor (16) can be cooled by the coolant (14).

11 Claims, 5 Drawing Sheets

(56) References Cited

U.S. PATENT DOCUMENTS

2020/0086751 A1* 3/2020 Heyne .................... H01B 9/006
2022/0037056 A1   2/2022 Martinezvall et al.

FOREIGN PATENT DOCUMENTS

| DE | 102018123455 A1 | | 3/2020 |
|----|-----------------|---|--------|
| KR | 10-2440542 | * | 9/2022 |
| WO | 2020053104 A1 | | 3/2020 |
| WO | 2020114888 A1 | | 6/2020 |

* cited by examiner

COOLED CHARGING CABLE

RELATED APPLICATIONS

This application filed under 35 U.S.C § 371 is a national phase application of International Application Number PCT/EP2021/071032, filed Jul. 27, 2021, which claims the benefit of German Application No. 10 2020 120 819.7 filed Aug. 6, 2020, the subject matter of which are incorporated herein by reference in their entirety.

TECHNICAL FIELD

The invention relates to a single line for a charging cable for electric vehicles, and to a charging cable having such single lines.

BACKGROUND

Electric vehicles are usually charged at charging stations with the aid of charging cables. Such charging cables are normally connected at one end to the charging station and can be connected to an electric vehicle for the charging operation. The maximum charging power for charging an electric vehicle (electric car) depends on a plurality of factors, such as, for example, the charging power of the electric car, the charging station and the charging cable.

Electric vehicles can be charged with the aid of alternating current (AC) (also with the aid of three-phase current as a special form of alternating current) and/or direct current (DC). The current provided by way of the power network is always alternating current. However, batteries, such as batteries in an electric vehicle, are able to store only direct current. For charging, conversion from alternating current to direct current is therefore necessary.

One possibility for such a conversion is conversion in the electric vehicle itself. In this case, the converter/rectifier necessary for this purpose is situated in the vehicle. Consequently, in this case, only alternating current is transferred from the charging station by way of the charging cable into the vehicle. The converter, often in the form of or part of an on-board charger, in the vehicle converts the alternating current into direct current and charges the battery/storage battery of the vehicle. Most electric cars are suitable for charging with alternating current. The AC charging power can vary depending on the charger that is installed. For example, some vehicles charge only with 3.7 kW. Other vehicles can be charged with up to 22 kW and thus significantly more quickly. In general, today's alternating-current chargers provide various ranges between 16 A (3.7 kW) and 63 A (43 kW). Owing to the length of time that is necessary, alternating-current charging lends itself to charging a car at home or at work over a period of several hours.

In the case of the charging of electric vehicles with direct current (direct-current charging for short) in order to charge electric cars more quickly (fast charging for short), the converter/rectifier is to be found in the charging station itself. In this case, conversion is thus carried out by the converter/rectifier in the charging station or a DC charger outside the vehicle. That is to say, in the case of direct-current charging, a rectifier in the charging station converts the current directly and then charges the battery of the electric car by way of the charging cable. This means that direct current is transferred from the charger by way of the charging cable to the vehicle, where it is fed directly into the vehicle storage battery/vehicle battery, bypassing any converter/rectifier in the vehicle. The vehicle does not require an integrated device to convert alternating current into direct current. The charging cable used must therefore be able to transfer direct current. The plugs of the charging cable also differ depending on the type of charging. So-called fast charging stations permit high charging powers of, for example, up to 50 kW, up to 70 kW or even up to 250 kW—depending on the vehicle. DC charging stations and DC chargers are often found in the vicinity of motorways or at public charging stations, where not much time is available for charging.

Apart from the electric vehicle and the charging station, there are further factors which have an impact on the maximum charging power, such as, for example, the temperature and the charge level of the battery.

In addition to the temperature of the battery, the temperature of the charging cable also plays a part in the charging power and thus the duration of the charging operation. Charging systems for a high charging power generally lead to pronounced heating. Problems can occur in particular in the case of charging cables with relatively small cross sections. The relatively small cross sections would not normally be able to transfer the necessary power, because they would heat up too quickly owing to the current load. This could lead to the maximum permissible conductor temperature according to EN 50620 or IEC 62983 being exceeded after a certain time. The charging operation would have to be interrupted or discontinued where possible. Furthermore, the lines are damaged in terms of their service life.

In addition, the surface temperature of the charging line could likewise rise above the limit value of IEC 117 and possibly result in injuries to the user when touching/handling the charging cable. The heat energy that develops during charging must therefore be dissipated, for example with the aid of a cooling line. One approach that is nowadays taken in this respect is to integrate hoses into the cable construction, which hoses remove the heat from the cable. The medium in the cooling hoses can be gaseous or liquid. Generally, conducting liquids (e.g. a water/glycol mixture) are increasingly being used for cooling in the thermal management process.

In order to eliminate these problems, removal of the cooling hoses from the cable design has also been considered. However, this would lead to the application of conventional computational procedures in the line dimensioning and thus to substantially larger conductor cross sections. This is because only conventionally dimensioned conductor cross sections (e.g. according to VDE 0298-4) are able, without cooling, to carry the high current load without heating the cable greatly. However, this approach resulted in unwieldy charging cables which could no longer be used properly without additional technical support (e.g. lifting gear or guide crane).

Cooling solutions available nowadays for charging cables are not optimal in terms of cooling power, because a cooling hose touches an insulated line and thus undertakes heat transfer. However, the insulation prevents particularly efficient heat transfer and thus dissipation of the heat, because a further barrier layer to the evacuation of the heat must be overcome as a result of an additionally integrated cooling hose in the cable cross section. Moreover, there are also hose in hose solutions, which are not optimal owing to the complex connection technology of the various hoses.

EP 3 624 141 A1 discloses a single line for a charging cable and a charging cable having such single lines. The single line comprises an open support structure with a longitudinal extent, a conductor braid composed of conductors, and an insulating element. The conductor braid directly covers the open support structure along its longitudinal extent. The insulation element covers the open support structure and the conductor braid. There is at least one duct for a cooling fluid. This duct is formed by the support structure and the conductor braid. The support structure and the conductor braid can be penetrated by the cooling fluid. The insulating element cannot be penetrated by the cooling fluid and is electrically insulating. There is direct contact between the conductor braid and the cooling fluid.

The charging cables known from the prior art have in some cases an unsatisfactory charging power and/or in some cases an unsatisfactory cooling power and/or are limited in respect of the cooling media used. A further disadvantage in respect of the charging cables that is known from the prior art are large cross sections owing to the additional insertion of cooling hoses.

There is therefore a need to provide a flexibly usable single line and an associated charging cable with high charging power.

SUMMARY OF THE INVENTION

According to a first aspect of the invention, a single line for a charging cable is provided. The charging cable can be in the form of a charging cable for electric vehicles. The single line has a cooling hose. A cooling medium can be conveyed in the cooling hose. The single line further has at least one uninsulated electrical conductor. The at least one uninsulated electrical conductor is in heat-conducting connection with the cooling hose in such a manner that the at least one uninsulated electrical conductor can be cooled by the cooling medium.

In relation to the at least one uninsulated electrical conductor, the term "uninsulated" is to be understood as meaning that the electrical conductor is not electrically insulated. Heat-conducting connection can be understood as meaning a direct or indirect heat-conducting connection between the electrical conductor and the cooling hose. A heat-conducting exchange between the cooling hose (more specifically the cooling medium which can be conveyed in the cooling hose) and the uninsulated electrical conductor can be established by way of the heat-conducting connection. Owing to the heat-conducting connection, heat that develops as a result of the electrical conductor can be dissipated by way of the cooling medium which can be conveyed or is conveyed in the cooling hose, that is to say the electrical conductor can be cooled, for example, directly by means of the cooling medium which can be conveyed or is conveyed in the cooling hose by way of the heat-conducting connection, without insulation around the electrical conductor impairing the heat transfer and/or heat dissipation.

According to a first possible exemplary embodiment, the at least one uninsulated electrical conductor can have a plurality of electrical conductors which are not insulated from one another or can be in the form of a plurality of electrical conductors which are not insulated from one another. In other words, according to the first possible exemplary embodiment, the single line can have a plurality of electrical conductors which are not insulated from one another (often also referred to hereinbelow simply as "a plurality of electrical conductors" or "electrical conductors" for short). The plurality of electrical conductors can be arranged around the cooling hose in the circumferential direction of the cooling hose.

As a result of the arrangement of the electrical conductors around the cooling hose, the electrical conductors are cooled efficiently. The single line for the charging cable and the corresponding charging cable can therefore be operated with a high charging power without pronounced heating occurring. The electrical conductors have a larger surface area than a corresponding single conductor. Cooling of the electrical conductors is thus efficient. The cooling medium can be, for example, liquid or gaseous.

The plurality of electrical conductors can be in direct contact with the cooling hose. For example, the electrical conductors can be in contact directly with the outside/outer surface of the cooling hose. This results in particularly efficient cooling of the electrical conductors. The plurality of electrical conductors can be in indirect contact with the cooling medium. For example, the plurality of electrical conductors can be separated from the cooling medium by the cooling hose.

The indirect contact between the electrical conductors and the cooling medium has the result that the electrical conductors, for example the copper of such a conductor, are not surrounded directly by the cooling liquid. In this way, problems or risks owing to direct contact between the cooling medium and the electrical conductors are avoided. Furthermore, the cooling medium does not necessarily have to be insulating and it does not necessarily have to be ensured that no conducting particles enter the cooling circuit, for example as a result of heat exchangers etc. Furthermore, the cooling medium can be optimized in terms of its environmental compatibility.

The plurality of electrical conductors can be arranged around the cooling hose stranded with one another, braided with one another or not stranded with one another. In the case of a braided or stranded arrangement around the cooling hose, the electrical conductors can be cooled even more efficiently. In the case of an unstranded arrangement of the electrical conductors around the cooling hose, the construction can be of a particularly simple design.

According to a second possible exemplary embodiment, the at least one uninsulated electrical conductor can be arranged in the cooling hose. For example, the at least one uninsulated electrical conductor can be arranged in the interior of the cooling hose. The at least one uninsulated electrical conductor can be in the form of, for example, a single electrical conductor or single conductor.

The at least one uninsulated electrical conductor can be in direct contact with the cooling medium. In this case, the cooling medium can be in the form of an electrically insulating (i.e. in the form of a non-electrically conducting cooling medium). Owing to the direct contact between the cooling medium and the at least one uninsulated electrical conductor, the at least one electrical conductor can be cooled particularly efficiently. The at least one uninsulated electrical conductor can be in indirect contact with the cooling hose. The electrical conductor can be in the form of a solid conductor or in the form of a flexible litz wire. The litz wire can have a plurality of (uninsulated) single conductors or single wires or consist of a plurality of (uninsulated) single conductors or single wires.

The cooling hose can generally be a body extending in the longitudinal direction of the charging cable. The body can have a cavity in which a cooling medium (which can also be referred to as a cooling agent) is able to circulate. The cooling hose is not limited to a particular cross section. The cooling hose can have, for example, a round, quadrangular or oval cross section. The cooling hose can have the form of a hollow cylinder, but is not limited to such a form. The cooling hose extends, for example, along the full length of the single line. The cooling hose is flexible, that is to say in particular not rigid. The cooling hose is, for example, elastically bendable or deformable.

The cooling hose can be configured so that it is at least almost impervious or impenetrable to the cooling medium. To that end, the cooling hose can be closed completely, for example, in the longitudinal direction and the circumferential direction. For example, the cooling hose can have a sheathing, so that the cooling hose forms in its interior a cavity for receiving the cooling medium. The sheathing can be configured so that it is at least almost impervious or impenetrable to the cooling medium. In this way, the cooling medium can circulate in the cavity but it is at least almost impossible for it to penetrate the sheathing. In the case of the single line according to the first exemplary embodiment, the electrical conductors arranged around the cooling hose, for example around the sheathing of the cooling hose, thus do not come into contact with the cooling medium if the cooling hose, in particular the sheathing of the cooling hose, is in an undamaged state. Therefore, in principle any cooling medium can be used. In the case of an undamaged cooling hose, there is therefore no contact between the cooling medium and the electrical conductors, and therefore no problems on contact between the cooling medium and the electrical conductors, in the case of the single line according to the first exemplary embodiment.

In the case of the single line according to the first exemplary embodiment, the sheathing of the cooling hose can surround the cooling medium. The electrical conductors can be situated outside the sheathing, for example on the outside/outer surface of the sheathing. In the case of the single line according to the second exemplary embodiment, both the cooling medium and the at least one electrical conductor can be surrounded by the sheathing.

The at least one electrical conductor, for example the plurality of electrical conductors, can be in the form of copper conductors. Owing to the high electrical conductivity of copper, the charging power of the charging cable can be high in the case where the at least one electrical conductor is in the form of a copper conductor.

The single line can further have an insulating element. The insulating element can surround the at least one electrical conductor and the cooling hose. In the case of the first exemplary embodiment, the insulating element can surround the plurality of electrical conductors directly. For example, in the case of the first exemplary embodiment, the insulating element can surround the plurality of electrical conductors as well as the cooling hose around which the plurality of electrical conductors are arranged. In the case of the single line according to the first exemplary embodiment, for example, the insulating element can be directly in contact with the electrical conductors. In the case of the single line according to the first exemplary embodiment, for example, the insulating element can be directly in contact with the cooling hose, for example with the outside/outer surface of the cooling hose.

The at least one electrical conductor, for example the plurality of electrical conductors, can form a direct-current lead. The direct-current lead serves to transfer direct current in the charging cable. For example, the direct-current lead can be one of the (two) direct-current leads of a charging cable which are necessary for transferring direct current.

According to a second aspect, a charging cable is provided. The charging cable is in the form of, for example, a charging cable for electric vehicles. The charging cable has a first single line, as is/has been described herein, and a second single line, as is/has been described herein. Accordingly, the charging cable has a first cooling hose (i.e. the cooling hose of the first single line) and a second cooling hose (i.e. the cooling hose of the second single line). In other words, the charging cable can have a first single line according to the first exemplary embodiment and/or according to the second exemplary embodiment and a second single line according to the first exemplary embodiment and/or according to the second exemplary embodiment.

According to a first variant of the charging cable, the charging cable can have as the first single line a single line according to the first exemplary embodiment and as the second single line a single line according to the first exemplary embodiment. In this case, a plurality of electrical conductors are accordingly arranged around the first cooling hose in the circumferential direction of the first cooling hose. A plurality of electrical conductors are correspondingly arranged around the second cooling hose in the circumferential direction of the second cooling hose.

The plurality of electrical conductors around the first cooling hose can form a positive direct-current lead. The plurality of electrical conductors around the second cooling hose can form a negative direct-current lead. Efficient direct-current charging of electric vehicles can thus be carried out by means of the charging cable.

According to a second variant of the charging cable, the charging cable can have as the first single line a single line according to the second exemplary embodiment and as the second single line a single line according to the second exemplary embodiment. In this case, an electrical conductor is arranged in the interior of the first cooling hose. An electrical conductor is further correspondingly arranged in the interior of the second cooling hose.

The electrical conductor in the first cooling hose can form a positive direct-current lead. The electrical conductor in the second cooling hose can form a negative direct-current lead. Efficient direct-current charging of electric vehicles can thus be carried out by means of the charging cable.

For example, currents of a hundred amperes (A), or several hundred amperes, for example of up to about 500 A, can be transferred using the charging cable according to the first variant and according to the second variant without—in the case of intact cooling—appreciable heating of the single lines and/or of the charging cable. That is to say, despite relatively small cross sections of the single lines, a high power can be transferred from the charging station into the vehicle (and thus to the battery).

The first cooling hose (i.e. the cooling hose of the first single line) can be in the form of a feed and the second cooling hose (i.e. the cooling hose of the second single line) can be in the form of a return for the cooling medium. The cooling medium is thus able to circulate fully in the charging cable. The feed can also be referred to as an outgoing line. The return can also be referred to as a return line. For example, the feed can constitute an outgoing line to a plug cooling means and the return can constitute a return line for cooling fluid from the plug cooling means. The outgoing line can be understood as being a channel or hose which leads away from a location with high fluid pressure. The return line can be understood as being a channel or hose which leads to a location with low fluid pressure. The cooling fluid can be transported outward through the feed and back through the return.

Alternatively, the cooling fluid can be transported outward or back through both single lines and back through further hoses. Furthermore, the cooling medium, for example in the form of a cooling fluid, can be pumped through the single lines and emerge at the end.

Furthermore, the first cooling hose and the second cooling hose, for example, can be in the form of a feed for the cooling medium. In this case, an additional return, for example, for the cooling medium can be arranged in the charging cable. Alternatively, the first cooling hose and the second cooling hose, for example, can be in the form of a return for the cooling medium. In this case, an additional feed, for example, for the cooling medium can be arranged in the charging cable.

The charging cable can have an outer jacket. The outer jacket protects the charging cable and can therefore also be referred to as a protective jacket. The common outer jacket holds the two single lines together and protects them against wear and environmental influences, for example. The outer jacket can additionally be heat-insulating. The heat insulation is advantageous in particular if the cooling medium is in the form of a cooling fluid. The heat insulation prevents the cooling fluid from freezing, for example.

The charging cable can have one or more conductors or one or more leads for charging with alternating current (alternating-current conductors for short). By means of the one or more conductors for alternating current, the charging cable can be used for the alternating-current charging of an electric vehicle. For example, the charging cable can be a combined cable with which both direct-current and alternating-current charging is possible. Purely by way of example, mention may be made here of a possible configuration with three conductors/leads (conductor, neutral conductor, ground), five conductors/leads (three conductors, neutral conductor, ground) or seven conductors/leads (three conductors, neutral conductor, ground, and two further conductors for communication between an energy source, e.g. a charging station, and an energy sink, e.g. a battery of an electric vehicle or an electric vehicle). Additionally or alternatively, the charging cable can have data lines.

The data lines can be configured for the transfer of data between an energy source/current source, for example a charging station, and an energy sink/current sink, for example a vehicle battery/vehicle. By way of the data lines, the energy source/current source and the energy sink/current sink can communicate with one another.

The charging cable can have at least one sensor. The at least one sensor can be in the form of a temperature sensor. The temperature sensor is configured to detect the temperature of the charging cable. The temperature sensor can be in the form of a sensor lead inserted into the charging cable, for example in the form of a sensor lead interlaced or braided into the charging cable.

The charging cable can further have at least a second sensor. The at least a second sensor can be configured to monitor a state of the charging cable and communicate this to a user by way of an evaluation unit.

In one exemplary embodiment, the charging cable can have at least two sensors. At least one of the at least two sensors can be in the form of a temperature sensor. The temperature sensor is configured to detect the temperature of the charging cable. The temperature sensor can be in the form of a sensor lead inserted into the charging cable. For example, the temperature sensor in the form of a sensor lead can be/can have been interlaced or braided into the charging cable. With the aid of the temperature sensor it is possible in a simple manner to determine and optionally monitor whether the charging cable is in an appropriate temperature range. For example, the charging cable can be monitored by means of the temperature sensor for overheating. The inserted sensor leads can be/can have been flexibly braided into the line, so that the line is not damaged thereby.

The temperature sensor and/or the at least a second sensor can be in the form of a resistance-based sector sensor. The at least a second sensor can be a sensor for measuring at least one further parameter other than the temperature. For example, the charging cable can have or be in the form of at least one sensor cable (at least one line) for measuring the temperature and at least one further parameter.

The charging cable and in particular the at least two sensors can be connected, for example wirelessly and/or in a wired manner, to an evaluation unit. The evaluation unit can be, for example, an external evaluation unit. The evaluation unit can be connected to the charging cable, for example, by way of a cloud or can be in the form of a cloud. The evaluation unit can be configured to evaluate data acquired by the charging cable. The evaluation unit can be configured to warn of a possible failure and optionally react in dependence on the evaluated data.

The charging cable, with the evaluation unit, can form a common charging system according to a third aspect of the invention. In other words, a charging system according to a third aspect of the invention can have the charging cable and the evaluation unit. Alternatively or additionally to the evaluation unit, the charging system can have the charging cable, an end connection and a plug. The end connection can have an inlet for the cooling medium, which is able to introduce the cooling medium at least into one of the single lines, more specifically into the cooling hose of at least one of the single lines, and is able to receive the cooling medium from another of the single lines, more specifically from the cooling hose of another of the single lines. The plug is configured to be connected to the vehicle. In addition to the electrical contacts for electrical connection of the electrical conductors that are present to lines of the vehicle, the plug can have a fluid return which is able to receive the cooling medium from the cooling hose of a single line and convey it to the cooling hose of the other single line.

According to a fourth aspect there can further be provided a charging station having the charging cable according to the second aspect or having a charging system according to the third aspect.

Although some of the aspects described above have been described in relation to the single line according to the first aspect, these aspects can have been/can be correspondingly implemented also in the charging cable according to the second aspect, in the charging system according to the third aspect and/or in the charging station according to the fourth aspect, and vice versa.

BRIEF DESCRIPTION OF THE DRAWINGS

The present invention is to be explained further with reference to figures, in which, in schematic form.

DETAILED DESCRIPTION

In the following text, specific details are set out, without implying any limitation, in order to provide a complete understanding of the present invention. It is, however, clear to a person skilled in the art that the present invention can be used in other exemplary embodiments which may differ from the details set out hereinbelow. Furthermore, the figures serve merely for the purpose of clarifying exemplary embodiments. They are not true to scale and are merely intended to reflect the general concept of the invention by way of example. For example, features that are contained in the figures should by no means be regarded as a necessary constituent.

Figure 1:
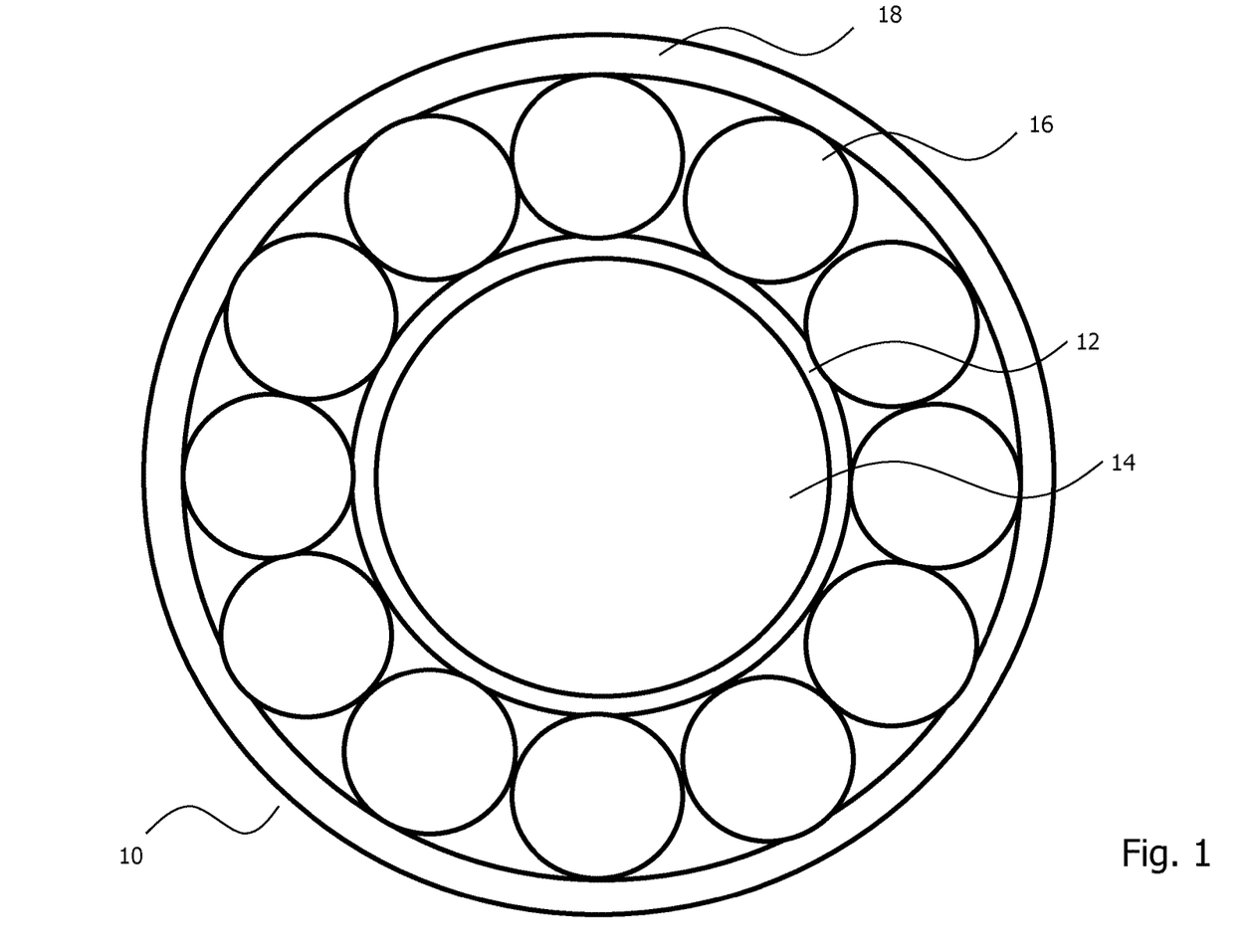
FIG. 1 shows an exemplary embodiment of a single line.

FIG. 1 shows an exemplary embodiment of a single line 10 for a charging cable for electric vehicles. The single line 10 has a cooling hose 12, and a plurality of electrical conductors 16 which are not insulated from one another. A cooling medium 14 can be conveyed in the cooling hose 12. More specifically, the cooling hose 12 of FIG. 1 has, for example, a sheathing, an outer jacket or an outer sleeve and an at least largely hollow interior space. The cooling medium 14 can be conveyed in the interior space. The outer jacket can also be referred to as an insulating sleeve and will mainly be referred to as such in the following text.

The plurality of electrical conductors 16 are arranged around the cooling hose 12 in the circumferential direction of the cooling hose 12. In the example of FIG. 1, the electrical conductors 16 are each in direct contact with the outside (the outer surface) of the cooling hose, for example with the outside of the insulating sleeve of the cooling hose 12.

The cooling hose 12 is at least almost impervious to the cooling medium 14. That is to say, in a normal, undamaged state of the cooling hose 12, the cooling medium 14 cannot normally penetrate to the outside from the interior (the interior space) of the cooling hose 12. In an undamaged state, the insulating sleeve of the cooling hose 12 is at least almost impervious/impenetrable to the cooling medium. The electrical conductors 16 therefore do not come into contact with the cooling medium 14 when the cooling hose 12 is undamaged.

The electrical conductors 16 can each have or be formed of single wires or litz conductors or braids. The electrical conductors 16, more specifically the totality of the electrical conductors 16 (not each of the conductors itself), is surrounded by an insulating element 18. The insulating element 18 serves inter aka to electrically insulate the electrical conductors 16.

In the following text, it is assumed by way of example in relation to FIGS. 2 to 4 that the electrical conductors 16 are copper conductors. Therefore, in the following text, mention will in some cases be made to copper conductors 16 in relation to FIGS. 2 to 4.

Figure 2:
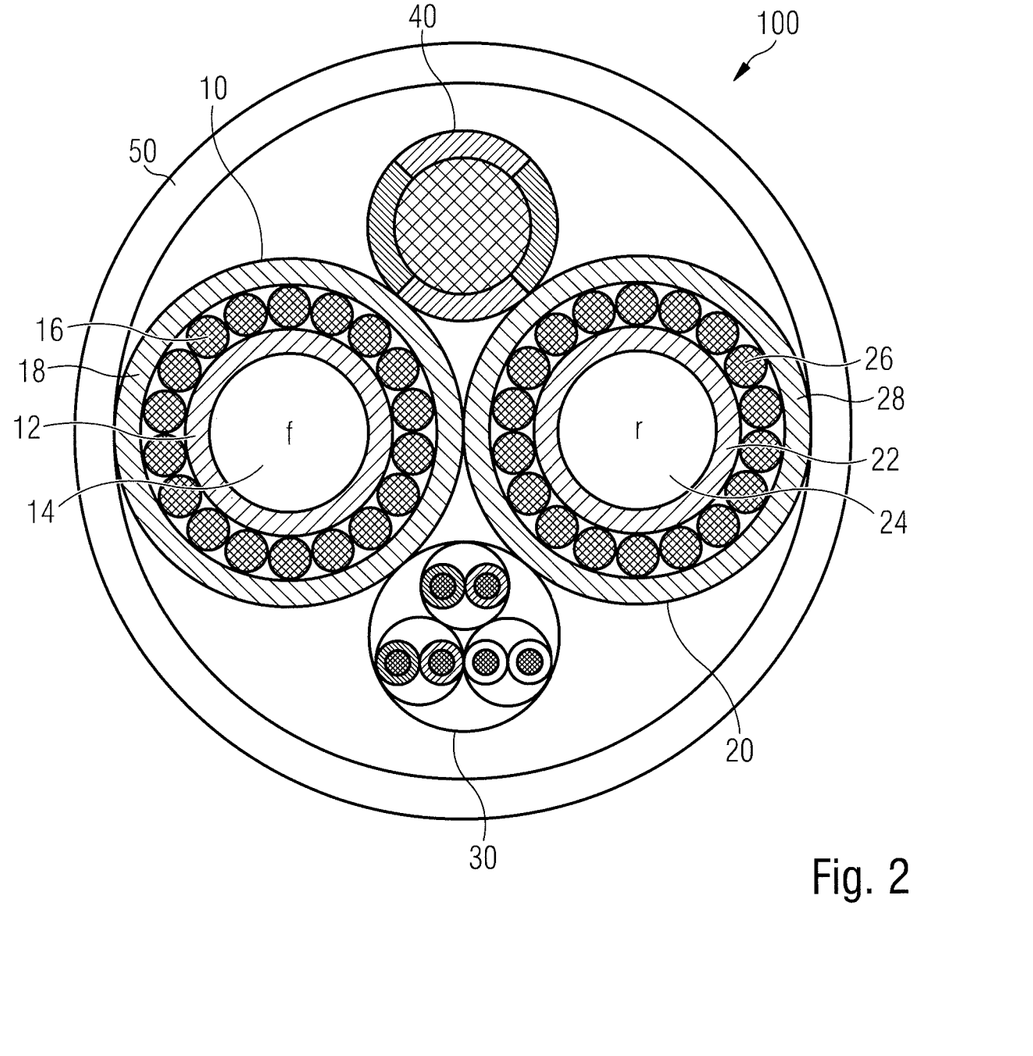
FIG. 2 shows a first exemplary embodiment of a charging cable having two single lines according to FIG. 1.

FIG. 2 shows a first exemplary embodiment of a charging cable 100. The charging cable 100 has a first single line 10 from FIG. 1 and a second single line 20 from FIG. 1. The charging cable 100 can optionally further have alternating-current lines. The alternating-current lines may, however, also be omitted. If there is no alternating-current line, the charging cable is in the form of a direct-current charging cable. By contrast, if the two single lines 10, 20 and alternating-current lines are provided, then the charging cable is in the form of a combined charging cable for either direct- or alternating-current charging. One or more signal lines 30 are further arranged in the charging cable 100. A protective conductor 40 is further arranged in the charging cable 100. The charging cable 100 is surrounded by an outer jacket 50.

The charging cable 100 shown in schematic form in FIG. 2 can be used as a charging cable for electric vehicles. For this application, the charging cable 100 is configured to permit a transfer capacity of, for example, up to 50 kW or up to 70 kW or up to 250 kW or up to 500 kW or up to 800 kW.

Purely by way of example, the cooling hose 12 of the first single line 10 is in the form of a feed and the cooling hose 22 of the second single line 20 is in the form of a return for the cooling medium. In the feed, the cooling medium is provided with reference numeral 14. In the return, the cooling medium is provided with reference numeral 24. Furthermore, by way of example, the plurality of electrical conductors 16 of the first single line 10 form a positive direct-current lead and the plurality of electrical conductors 26 of the second single line 20 form a negative direct-current lead. This is to be understood purely by way of example, and the invention is not limited to this example.

As a result of the specific arrangement of the electrical conductors 16, for example copper conductors, around each cooling hose 12, 22, the best possible or maximum heat dissipation is ensured. Unlike when cooling hoses that are braided into the conductor geometry are used, there are a plurality of contact points on the cooling body (hose) in the exemplary embodiments of FIGS. 1 and 2. There is no additional insulation between the electrical conductors 16 (the copper/the copper conductors 16) and the direct contact with the cooling hose 12, 14. As a result of the direct contact and the large number of electrical conductors 16, for example copper conductors, at each cooling hose 12, 22, the best possible or maximum heat transfer is provided. Nevertheless, the cooling medium 14 is separated from the electrical conductors 16 (the copper/the copper conductors 16) by the insulating sleeve of the cooling hose 12, 22. Any type of cooling medium can thus be used. This is advantageous over solutions in which electrical conductors, such as copper conductors, are laid directly into a cooling liquid or are surrounded by a cooling liquid. There is a risk here if the cooling liquid does not insulate completely/100%. At the high voltages present, leakage currents, for example through the cooling liquid, and thus losses in the energy transfer can readily occur.

That is to say, although the more effective solutions in the prior art cool the conductors directly, that is to say the copper is surrounded by the cooling liquid, this can lead to problems and risks. The liquid must be insulating, and no conducting particles, for example as a result of heat exchangers etc., must enter the cooling circuit. Furthermore, the environmental compatibility is not sufficiently good in the case of oils.

Figure 3:
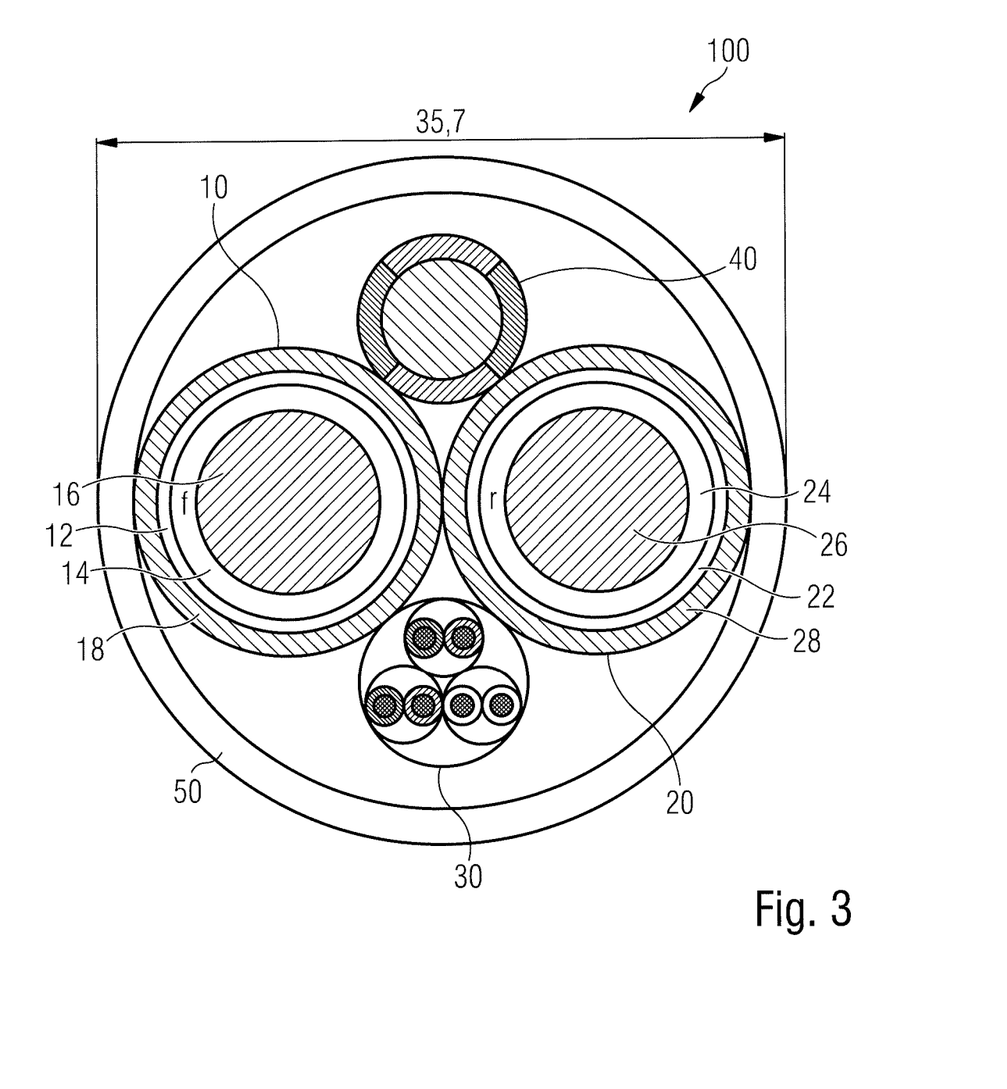
FIG. 3 shows a second exemplary embodiment of a charging cable having two single lines.

FIG. 3 shows a second exemplary embodiment of a charging cable 100. The construction of the charging cable 100 according to the second exemplary embodiment and the construction of the charging cable 100 according to the first exemplary embodiment of FIG. 2 substantially correspond to one another. Differences will be described in the following text. The charging cable 100 has a first single line 10 and a second single line 20. The single lines 10, 20 in the charging cable 100 of FIG. 3 are of a different form to the single line 10 of FIG. 1. In the interior of the single line 10 there is arranged an uninsulated electrical conductor 16. In the single line 10, the cooling hose 12 and the electrical conductor 16 run coaxially with the longitudinal axis of the single line 10 as a common axis. The uninsulated electrical conductor 16 can be a solid conductor or a flexible litz wire. The electrical conductor 16 is surrounded by the cooling medium 14. In this case, the cooling medium is an electrically insulating (i.e. non-conductive) cooling medium 14. The cooling medium 14 is conveyed in the cooling hose 12.

The cooling hose 12 therefore surrounds the cooling medium 14. The cooling hose 12 is surrounded by an insulating element 18. The construction of the second single line 20 corresponds to that of the first single line 10.

The charging cable 100 can optionally further have signal lines 30. The charging cable can further have alternating-current lines, but these can also be omitted. If there is no alternating-current line, the charging cable 100 is in the form of a direct-current charging cable. By contrast, if the two single lines 10, 20 and an alternating-current line are provided, then the charging cable is in the form of a combined charging cable for either direct- or alternating-current charging. A protective conductor 40 is further arranged in the charging cable 100. The charging cable 100 is surrounded by an outer jacket 50.

Purely by way of example, the cooling hose 12 of the first single line 10 is in the form of a feed and the cooling hose 22 of the second single line 20 is in the form of a return for the cooling medium. In the feed, the cooling medium is provided with reference numeral 14. In the return, the cooling medium is provided with reference numeral 24. Furthermore, by way of example, the electrical conductor 16 of the first single line 10 forms a positive direct-current lead and the electrical conductor 26 of the second single line 20 forms a negative direct-current lead. This is to be understood purely by way of example, and the invention is not limited to this example.

Figure 5:
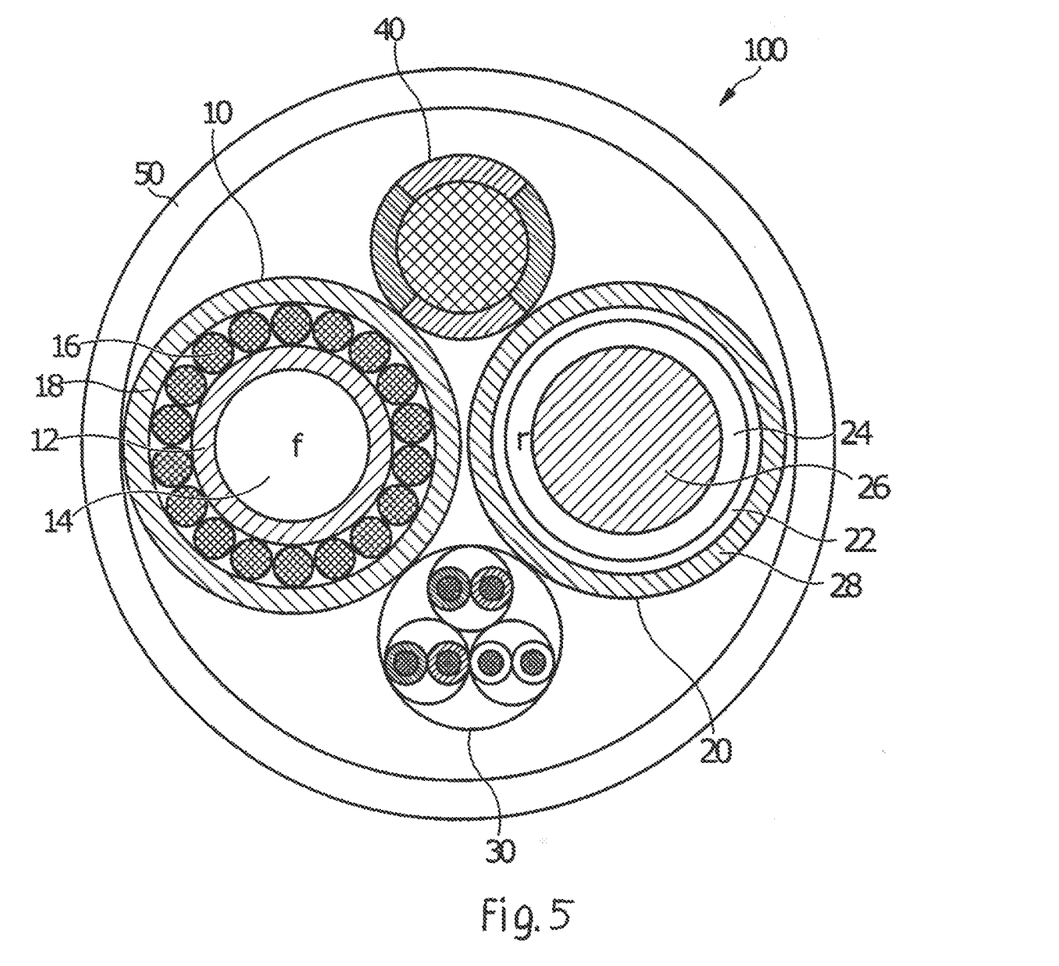
FIG. 5 shows an example of a charging cable having two single lines according to the first and second respective exemplary embodiments.

With this in mind, it will be appreciated that the charging cable 100 can have a first single line 10 according to the first exemplary embodiment and a second single line 20 according to the second exemplary embodiment (FIG. 5).

Figure 4:
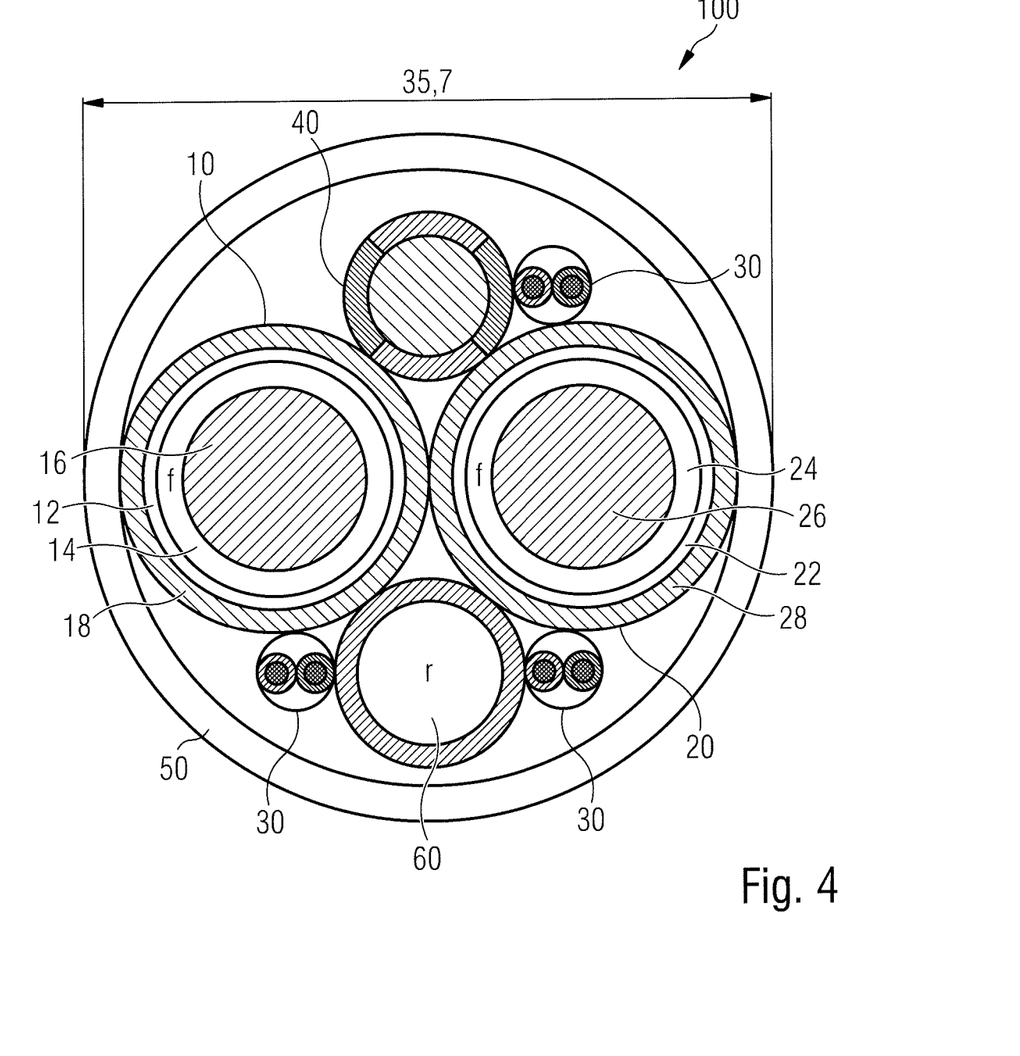
FIG. 4 shows a third exemplary embodiment of a charging cable having two single lines.

FIG. 4 shows a third exemplary embodiment of a charging cable 100. The charging cable 100 has a first single line 10 and a second single line 20. The single lines 10, of FIG. 4 correspond to the single lines 10, 20 of FIG. 3. Differences compared to the second exemplary embodiment of FIG. 3 will be described hereinbelow.

The charging cable 100 can optionally have alternating-current lines. The alternating-current lines can, however, also be omitted. If there is no alternating-current line, the charging cable 100 is in the form of a direct-current charging cable. By contrast, if the two single lines 10, 20 and an alternating-current line are provided, then the charging cable is in the form of a combined charging cable for either direct- or alternating-current charging. In the example of FIG. 4, the charging cable 100 further has a signal line 30, which is distributed between a plurality of single lines, in the example shown between three single lines. A protective conductor 40 is further arranged in the charging cable 100. The charging cable 100 is surrounded by an outer jacket 50.

Purely by way of example, the cooling hose 12 of the first single line 10 is in the form of a feed and the cooling hose 22 of the second single line 20 is in the form of a feed for the cooling medium. In the feed of the first single line 10, the cooling medium is provided with reference numeral 14. In the feed of the second single line 20, the cooling medium is provided with reference numeral 24. Furthermore, by way of example, the electrical conductor 16 of the first single line 10 forms a positive direct-current lead and the electrical conductor 26 of the second individual line 20 forms a negative direct-current lead. This is to be understood purely by way of example, and the invention is not limited to this example. The return is arranged in an additional hose 60.

Sensors (not shown), for example one or more temperature sensors, can additionally be/have been inserted in the charging cable 100 according to each of the three exemplary embodiments. This increases the reliability of the charging cable 100 through purposive monitoring, for example temperature monitoring.

With the described charging cable 100 according to each of the exemplary embodiments, an improved line for charging electric vehicles is provided. Previous cooled charging lines, which work with water/glycol as the cooling medium, for example, have hoses braided into the line construction. In some cases, a plurality of hoses are here used for the feed and return. With the described exemplary embodiments according to FIGS. 1 and 2, the large number of hoses in the cable can at least be reduced, for example because extensive points of contact between the insulating sleeve of the cooling hose/hoses 12, 22 and the electrical conductors 16 make heat transfer more efficient. With the exemplary embodiments according to FIGS. 3 and 4, the electrical conductor is in direct contact with the cooling medium. That is so say, an advantage of the exemplary embodiments of FIGS. 1 to 4 is the better or even optimal heat transfer compared to the prior art.

In other words, some known solutions are not optimal in terms of the cooling power, because a hose touches an insulated conductor and thus undertakes heat transfer. Known hose-in-hose solutions are not optimal owing to the complex connection technology of the various hoses. In addition, the surface temperature of the charging line would also rise above the limit value of IEC 117 and potentially result in injuries to the user when touching/handling the cable. The heat energy that develops during charging must be dissipated with the aid of a cooling line. To that end, hoses are integrated into the cable construction, which hoses remove the heat from the cable. Generally, conducting liquids (e.g. a water/glycol mixture) are increasingly being used for cooling in the thermal management process. If the cooling hoses were also removed from the cable design, this would lead to the conventional computational procedure in the line dimensioning and thus to substantially larger conductor cross sections. Only conventionally dimensioned conductor cross sections (e.g. according to VDE 0298-4) are able to carry the large current load without appreciably heating the cable. However, this would be far too unwieldy and could no longer be used properly without additional technical support (e.g. lifting gear or guide crane).

By contrast, by means of the cooled single line 10 of FIG. 1 and the cooled charging cable 100 of FIGS. 2 to 4, it is possible, despite smaller cross sections, to transfer a high power from the charging station into the vehicle (and thus to the battery). Normally, the smaller cross sections would not be able to transfer this power, because they would heat up too quickly due to the current load. This would lead to the maximum permissible temperature according to EN 50620 or IEC 62893 being exceeded after a certain time. The lines could thereby be damaged in terms of their service life. With the integration of the described thermal management (cooling system), the temperatures which occur in the case of a high current load can be compensated for. This allows the conductor cross section to be reduced with the same current load as compared to conventional lines. Handling is thus made substantially easier and user-friendly.

Furthermore, with the described exemplary embodiments of FIGS. 1 to 4, the number of cooling hoses is kept small. Thus, in the complete charging cable 100 of FIGS. 2 to 4, there are only two cooling hoses 12, 14. In addition, no expensive or complicated connection technology is required for the hoses 12, 14. This is advantageous over other lines, in which complex hose-in-hose cooling circuits are produced. In the described exemplary embodiments of FIGS. 2 and 3 there are, by way of example, only a feed and a return, which are sufficient in terms of their cooling action to transport the heat from the charging cable 100. The charging cable of FIGS. 2 to 4 remains flexible, in order to be able to withstand normal bending loads, as defined, for example, in IEC 62440, and is optimally designed for the application of direct-current charging, in particular fast charging, and the very high power transfer with active cooling that is necessary therefor.

The invention claimed is:

1. A charging cable for example for electric vehicles, wherein the charging cable has a first single line and a second single line, wherein the first single line has:
    a cooling hose in which a cooling medium can be conveyed; and
    a plurality of first uninsulated electrical conductors arranged around the circumference of the cooling hose and having a heat-conducting connection therewith such that the first uninsulated electrical conductors can be cooled by the cooling medium, wherein the second single line has:
    a cooling hose in which a cooling medium can be conveyed; and
    only one second uninsulated electrical conductor
arranged in the interior of the cooling hose and having a heat-conducting connection therewith such that the second uninsulated electrical conductor can be cooled by the cooling medium,
    wherein:
    the cooling hose of the first single line is in the form of a feed for the cooling medium and the cooling hose of the second single line is in the form of a feed for the cooling medium, and an additional hose is arranged in the charging cable as a return; or
    the cooling hose of the first single line is in the form of a return for the cooling medium and the cooling hose of the second single line is in the form of a return for the cooling medium, and an additional hose is arranged in the charging cable as a feed.

2. The charging cable as claimed in claim 1, wherein the plurality of first uninsulated electrical conductors are in direct contact with the cooling hose of the first single line.

3. The charging cable as claimed in claim 1, wherein the plurality of first uninsulated conductors are arranged around the cooling hose of the first single line stranded or not stranded with one another.

4. The charging cable as claimed in claim 1, wherein the second uninsulated electrical conductor is in direct contact with the cooling medium.

5. The charging cable as claimed in claim 1, wherein each of the cooling hoses is configured to be impenetrable to the cooling medium.

6. The charging cable as claimed in claim 1, wherein the first and second uninsulated electrical conductors are each in the form of a copper conductor.

7. The charging cable as claimed in claim 1, wherein each single line further has insulating elements that surround the respective cooling hoses and the uninsulated electrical conductors associated therewith.

8. The charging cable as claimed in claim 1, wherein one of the uninsulated electrical conductors forms a direct-current lead.

9. The charging cable as claimed in claim 1, wherein the first uninsulated electrical conductors of the first single line form a positive direct-current lead and the second uninsulated electrical conductor of the second single line forms a negative direct-current lead.

10. The charging cable as claimed in claim 1, wherein the charging cable has at least one signal line and/or at least one protective conductor and/or at least one sensor.

11. The charging cable as claimed in claim 1, wherein one or both of the cooling hoses have a round, quadrangular or oval cross section.

* * * * *

UNITED STATES PATENT AND TRADEMARK OFFICE
CERTIFICATE OF CORRECTION

| | | |
|---|---|---|
| PATENT NO. | : 12,334,233 B2 | Page 1 of 1 |
| APPLICATION NO. | : 18/019105 | |
| DATED | : June 17, 2025 | |
| INVENTOR(S) | : Guenter Koenig and Sven Spindler | |

It is certified that error appears in the above-identified patent and that said Letters Patent is hereby corrected as shown below:

In the Claims

Column 1, Line 21 Claim 1 should read:
A charging cable for electric vehicles, wherein the charging cable has a first single line and a second single line, wherein the first single line has:

Signed and Sealed this
Twenty-second Day of July, 2025

Coke Morgan Stewart
*Acting Director of the United States Patent and Trademark Office*